United States Patent
Wu

(10) Patent No.: US 10,733,496 B2
(45) Date of Patent: Aug. 4, 2020

(54) ARTIFICIAL INTELLIGENCE ENTITY INTERACTION PLATFORM

(71) Applicant: MICROSOFT TECHNOLOGY LICENSING, LLC, Redmond, WA (US)

(72) Inventor: Xianchao Wu, Tokyo (JP)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 639 days.

(21) Appl. No.: 15/420,426

(22) Filed: Jan. 31, 2017

(65) Prior Publication Data
US 2018/0218252 A1    Aug. 2, 2018

(51) Int. Cl.
*G06N 3/00* (2006.01)
*G06Q 50/00* (2012.01)
*G06Q 10/10* (2012.01)
*G06Q 30/02* (2012.01)
*G06Q 30/06* (2012.01)
*G06Q 20/06* (2012.01)

(52) U.S. Cl.
CPC ........... *G06N 3/006* (2013.01); *G06Q 10/10* (2013.01); *G06Q 30/02* (2013.01); *G06Q 30/06* (2013.01); *G06Q 50/00* (2013.01); *G06Q 50/01* (2013.01); *G06N 3/004* (2013.01); *G06Q 20/06* (2013.01); *G06Q 20/065* (2013.01)

(58) Field of Classification Search
CPC ........ G06N 3/004; G06N 3/006; G06Q 10/10; G06Q 20/06; G06Q 20/065; G06Q 20/0652; G06Q 20/0655; G06Q 20/0658; G06Q 30/02; G06Q 30/06; G06Q 50/00; G06Q 50/01
USPC ............................................. 706/11
See application file for complete search history.

(56) References Cited

U.S. PATENT DOCUMENTS

| | | | |
|---|---|---|---|
| 2007/0082738 A1* | 4/2007 | Fickie | A63F 13/12 463/42 |
| 2008/0178096 A1* | 7/2008 | Kusuda | H04L 12/66 715/758 |
| 2012/0030301 A1 | 2/2012 | Herold et al. | |
| 2014/0122619 A1 | 5/2014 | Duan | |
| 2014/0207882 A1* | 7/2014 | Joo | H04L 51/04 709/206 |
| 2014/0255895 A1 | 9/2014 | Shaffer et al. | |

(Continued)

OTHER PUBLICATIONS

"The Most Feature-Rich Chat Bot for YouTube Gaming", https://www.fussbot.io/, Retrieved on: Dec. 22, 2016, 6 pages.

(Continued)

*Primary Examiner* — Shane D Woolwine

(57) ABSTRACT

Described herein is a system and method for providing a conversation session with an artificial intelligence entity in a user interface. Once the conversation session with the artificial intelligence entity has been initiated, other individuals and/or artificial intelligence entities may be invited to join the conversation. In addition, other users may view the interactions between the individuals and the artificial intelligence entities without participating in the conversation. Although the other users are not participating in the conversation, the user interface enables these users to provide comments about the interactions. These comments may be used to train the artificial intelligence entities.

20 Claims, 9 Drawing Sheets

(56) References Cited

U.S. PATENT DOCUMENTS

| | | | |
|---|---|---|---|
| 2016/0026962 A1 | 1/2016 | Shankar et al. | |
| 2017/0200202 A1* | 7/2017 | Yu | G06Q 30/0215 |
| 2017/0230312 A1* | 8/2017 | Barrett | H04L 51/046 |
| 2017/0324868 A1* | 11/2017 | Tamblyn | H04M 3/5191 |

OTHER PUBLICATIONS

"BlipBot", http://getblipbot.com/, Retrieved on: Dec. 22, 2016, 2 pages.
Ulanoff, Lance, "Microsoft may be running the biggest Turing test in history", http://mashable.com/2016/02/05/microsoft-xiaoice-turing-test/, Published on: Feb. 6, 2016, 18 pages.
Sawant, Nimish, "Facebook F8: Messenger bots' first impressions point to a slow user experience", http://tech.firstpost.com/news-analysis/facebook-f8-messenger-bots-first-impressions-point-to-a-slow-user-experience-308967.html, Published on: Apr. 14, 2016, 5 pages.
Aryan, Akhil, "How intelligent (chat) bots can change our daily routine?", https://chatbotnewsdaily.com/how-intelligent-chat-bots-change-our-daily-routine-ec43dc01f1ca, Published on: Jul. 22, 2016, 10 pages.
Li, et al., "Video ChatBot: Triggering Live Social Interactions by Automatic Video Commenting", In Proceedings of the ACM on Multimedia Conference, Oct. 15, 2016, pp. 757-758.
"PhantomBot", https://phantombot.tv/, Retrieved on: Dec. 22, 2016, 15 pages.
"Nightbot", https://beta.nightbot.tv/, Retrieved on: Dec. 22, 2016, 4 pages.
Hannam, Chris, "Build a Sentiment Analysis Slack Chatbot in Python", http://blog.algorithmia.com/sentiment-malysis-slack-chatbot-python/, Published on: Sep. 7, 2016, 17 pages.
"Live.me—Social Live Video Streaming", https://itunes.apple.com/us/appilive.me-social-live-video/id1089836344?rnt=8, Retrieved on: Dec. 22, 2016, 5 pages.
"Broadcast Chat", https://support.voxer.com/hc/en-us/articles/204965177-Broadcast-Chat, Retrieved on: Dec. 22, 2016, 3 pages.
Mikolov, et al., "Distributed Representations of Words and Phrases and their Compositionality", in Proceedings of 27th Annual Conference on Neural Information Processing Systems, Dec. 5, 2013, pp. 1-9.

* cited by examiner

ARTIFICIAL INTELLIGENCE ENTITY INTERACTION PLATFORM

BACKGROUND

Today, conversational chat programs are becoming more and more popular. These conversational chat programs, sometimes referred to as "chatbots" allow users to carry on conversations with a virtual entity. In some instances, the chatbot may be used to answer a series of questions in a step-by-step manner. However, current chatbots have limited conversational abilities and cannot accurately predict a user's intention. Additionally, some users may not know how to best interact with a chatbot and as such, may be hesitant to interact with one.

It is with respect to these and other general considerations that embodiments have been described. Also, although relatively specific problems have been discussed, it should be understood that the embodiments should not be limited to solving the specific problems identified in the background.

SUMMARY

This disclosure generally relates to enabling individuals to directly interact with an artificial intelligence entity (e.g., a chatbot) while enabling additional individuals to view and comment on the interaction. As the additional individuals view the interaction, they can learn which artificial intelligence entities they want to interact with and also learn how to interact with the artificial intelligence entities.

In some implementations, the interactions between the individual and the artificial intelligence entity occur in real time or substantially real time. Thus, as the individual interacts with the artificial intelligence entity, the observers can view the interaction as it is occurring. The observers can also provide comments on the interaction. As comments or other such input is received, both from the individuals that are directly interacting with the artificial intelligence entity and the individuals that are watching the interaction, the comments and input is used to train the artificial intelligence entity so that conversations between the artificial intelligence entities and the individual are more accurate and natural.

Accordingly, described herein is a system comprising a processing unit and a memory storing computer executable instructions which, when executed by the processing unit, causes the system to perform a method, comprising, providing a first chat window in a user interface of a computing device that displays an interaction between a first individual and an artificial intelligence entity, wherein the interaction includes input provided by the first individual and a response provided by the artificial intelligence entity; and providing a second chat window in the user interface of the computing device, wherein the second chat window is associated with the first chat window and enables a second individual to provide input about the response provided by the artificial intelligence entity.

Also described is a method for training an artificial intelligence entity. This method includes displaying a first chat window in a user interface of a computing device that displays an interaction between one or more individuals and an artificial intelligence entity. In some implementations, the interaction includes input provided by the one or more individuals and a response to the input provided by the artificial intelligence entity. The method also includes displaying a second chat window in the user interface of the computing device. The second chat window is associated with the first chat window and enables a second individual that is viewing the interaction between the one or more individuals and the artificial intelligence entity to provide a second input. In some cases, the second input may indicate a relevance score associated with the response provided by the artificial intelligence entity. This score, along with the second input, may be used to further train the artificial intelligence entity.

In further aspects, a computer-readable storage medium storing computer executable instructions is disclosed. When the computer executable instructions are executed by a processing unit, the processing unit performs a method that includes displaying a user interface for enabling one or more individuals interact with one or more artificial intelligence entities. In some implementations, the user interface includes a first chat window that displays an interaction between the one or more individuals and the one or more artificial intelligence entities, and a second chat window that is associated with the first chat window. The second chat window enables a second individual to provide input about the interaction between the one or more artificial intelligence entities and the one or more individuals. The input provided by the second individual is used to train the one or more artificial intelligence entities.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
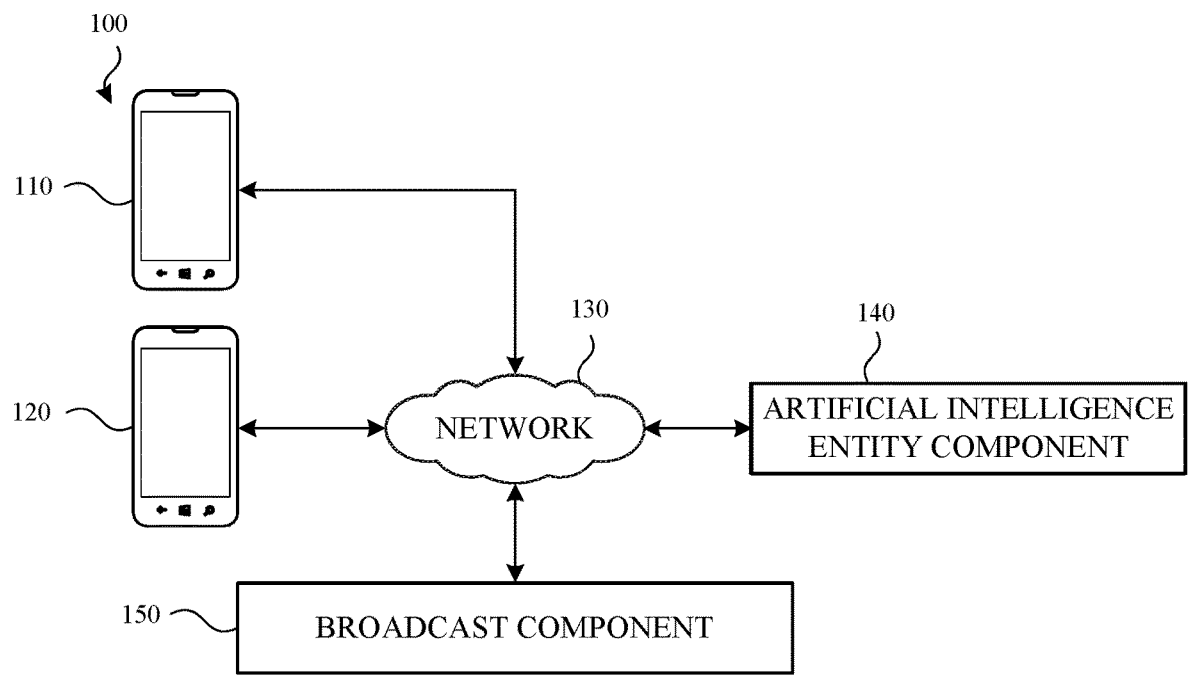
FIG. 1 illustrates a system for allowing individuals to broadcast their interaction with an artificial intelligence entity according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

This disclosure generally relates to enabling various individuals to directly interact with an artificial intelligence entity and to broadcast that interaction to other individuals. As used herein, the term "directly interact" means that an individual is interacting with an artificial intelligence entity in a first or primary chat window. This interaction may be broadcast or otherwise provided to other individuals that access the system so that they can view the interaction and provide input about the interaction.

For example, the present disclosure enables other individuals or observers to view and/or provide comments on the direct interaction in a secondary or second chat window that is associated with the first chat window. The comments and other input provided by these individuals may be used to further train the artificial intelligence entity so that interactions between the individual and the artificial intelligence entity are more natural and lifelike. The individuals that are viewing the interaction may also provide virtual gifts, virtual presents and/or virtual currency to the individuals that are broadcasting their interaction with the artificial intelligence entity.

In some cases, an artificial intelligence entity may be associated with a business entity. For example, a business entity may create an artificial intelligence entity and program the artificial intelligence entity to have knowledge about, and/or promote various products and/or services that the business entity offers.

In addition to promoting products and services provided by the business entity, the artificial intelligence entity has various characteristics, hobbies, and interests that may be shared with various users. As the users interact with the artificial intelligence entity and get to know the artificial intelligence entity (e.g., through various interactions and conversation sessions) the user may form a friendship with the artificial intelligence entity, and as a result, the business entity that created the artificial intelligence entity. Thus, as the friendship between the artificial intelligence entity and the individual grows, the individual may be more likely to purchase products provided by the business entity.

For example, if the business entity is a sushi restaurant, the artificial intelligence entity may a fish, a mermaid or other character. The artificial intelligence entity may be configured to provide information about the restaurant including, but not limited to, the address of the restaurant, the phone number of the restaurant, any specials that are being offered by the restaurant, the current wait time at the restaurant and so on. The artificial intelligence entity may also be configured to provide coupons, discounts or other promotions to the user.

However, in some instances, some individuals may be hesitant to interact with the various artificial intelligence entities created by the business entities. For example, an individual may not know which questions to ask the artificial intelligence entity, which artificial intelligence entities are popular or how to have a conversation with a particular artificial intelligence entity.

Accordingly, embodiments described herein enable individuals that interact with various artificial intelligence entities to broadcast their direct interactions with the artificial intelligence entities. During the broadcast, various other individuals may view the interaction and provide comments about the interaction. In some instances, the artificial intelligence entity that the user is interacting with may also interact with the various other individuals as they provide comments about the interaction. The comments about the interaction may be analyzed to determine how well the artificial intelligence entity is performing during the direct interaction and may also be used to further train the artificial intelligence entity.

As the other individuals view the interaction, the other individuals may provide gifts, presents or other indicators to show their appreciation to the individual that is broadcasting the direct interaction. These gifts or presents may be in the form of virtual presents, virtual currency or other virtual items. In some cases, the virtual gifts may be redeemed for actual currency or may be used or otherwise redeemed at the business entity associated with the artificial intelligence entity.

FIG. 1 illustrates a system 100 for broadcasting interactions with various artificial intelligence entities according to one or more embodiments of the present disclosure. Using the system 100, an individual may directly interact with various artificial intelligence entities. As the individual provides input (e.g., images, text, speech, sound, video clips, an emoji and so on) into a user interface of a computing device, the artificial intelligence entity provides a response. The interactions between the individual and the artificial intelligence entity may be broadcast to other individuals that access the system 100. During the broadcast, the other individuals may also provide comments about the direct interaction. These comments, as well the input provided by the individual that is directly interacting with the artificial intelligence entity, may be used to train the artificial intelligence entity. The training may be used to help the artificial intelligence entity learn how to respond to various types of input that is received.

In some implementations, an individual may interact with an artificial intelligence entity on a computing device such as, for example, computing device 110 and computing device 120. Computing device 110 and computing device 120 may be any computing device capable of connecting to a network 130. Example computing devices include, but are not limited to, a mobile telephone, a smart phone, a tablet, a phablet, a smart watch, a wearable computer, a personal computer, a desktop computer, a laptop computer, a gaming device/computer (e.g., Xbox®), a television, and the like.

Although computing devices are shown, the embodiments described herein may be implemented on any number of systems. In addition, the artificial intelligence entities may be provided as part of third party communication and/or collaboration software.

The computing device may include an interface (e.g., a user interface) that enables the user to interact with the various artificial intelligence entities that are part of the system 100. For example, a user may open or otherwise access a chat window or other such interface that allows the user to provide input to a selected artificial intelligence entity. The input may be a statement, a query, an image, a sound, an emoji, a recording and so on. Once the input is received, the input may be provided, over the network 130, to an artificial intelligence entity component 140.

The artificial intelligence entity component 140 parses the input to determine a subject matter of the input and how best to respond to the input. Once the input is parsed, the artificial intelligence entity component 140 provides a response that is output on the computing device (e.g., computing device 110). This process may repeat for the various turns of a conversation session between the artificial intelligence entity and the individual.

As described above, the system 100 may also enable the individual to broadcast the conversation session or other interaction with other individuals that access the system 100. Accordingly, the system 100 includes a broadcast component 150. In some implementations, the broadcast component enables various individuals to stream or otherwise broadcast live or real time chatting sessions between the individual and one or more artificial intelligence entities. In some implementations, the individual may also allow additional individuals to join the chat session with the artificial intelligence entity and directly interact with the artificial intelligence entity by providing input.

In some instances, the broadcast component 150 may allow an individual to open one or more channels on which the chat sessions will be broadcast. Other individuals that access the system 100 may access these channels to view the interaction. In some embodiments, the individual that opens the channel may specify a timeframe that the channel will be active. Additionally, a channel may be associated with a particular topic (e.g., travel, sports, etc.) and/or be associated with a particular artificial intelligence entity.

For example, a first individual may access the system 100 using computing device 110. The computing device 110 may display a user interface that enables the first individual to open a chat session or otherwise allow the first individual to directly interact with one or more artificial intelligence entities. The first individual may also associate a channel with the chat session. The broadcast component 150 may then broadcast the channel to other users of the system 100.

During the chat session, the first individual provides input into the user interface of the computing device 110. Once the input is received, the artificial intelligence component 140 parses the input and generates a response which is provided back to the computing device 110 and displayed on the user interface.

While (or before) the direct interaction between the first individual and the artificial intelligence entity is occurring, a second individual may access the system 100 using another computing device 120. The second individual may receive a list of channels, from the broadcast component 150, that are broadcasting interactions between various individuals and various artificial intelligence entities. The broadcast component 150 may also provide an indication as to how popular the various channels are, which artificial intelligence entities and/or individuals are involved in the interaction, the subject matter of the channels, broadcast times of the various channels and so on.

In this example, the second individual selects the channel that is broadcasting the direct interaction between an artificial intelligence entity and the first individual. When this channel is selected, a user interface is provided on a display of the computing device 120 that shows the interaction between the first individual and the artificial intelligence entity. For example, as the first individual provides input and the artificial intelligence entity responds to the input, the input and response is shown in real time or substantially real time to the second individual. Although a single individual is described, multiple individuals may access the channel and view the interaction. In some embodiments, a single individual may also access multiple channels. The multiple channels may be accessed simultaneously or one at a time.

The second computing device 120 may also display a second chat window in the user interface. The second chat window may be associated with the first chat window in which the interaction between the first individual and the artificial intelligence entity is occurring. The second chat window allows the second individual to provide input about the interaction that the second individual is viewing. For example, the second individual may provide comments, images, an emoji, or other type of input about the direct interaction he is viewing. Further, the second chat window also displays input provided by other individuals that are viewing the interaction between the first individual and the artificial intelligence entity.

In some implementations, as comments and other input is received in the second chat window, the broadcast component 150 may provide those comments and input to the artificial intelligence entity component 140. In some embodiments, this input may be viewed as a relevance score. For example, if the comments provided by the artificial intelligence entity is viewed (by either the observers of the interaction or the individual doing the interaction) as being related to the input, a first relevance score may be given. If the comments provided by the artificial intelligence entity is not on point or is viewed as not being relevant to the provided input, a second relevance score may be given. These comments provided by the observers and/or the individual doing the interaction, along with the relevance score and/or the input provided by the various individuals, may be used to train the artificial intelligence entity.

For example, the input provided by the first individual may be a question that asks an artificial intelligence entity named Rinna, "What is the weather going to be like today?" In response, Rinna states "It is going to be really warm. It is supposed to be around 92 degrees. You might want to wear shorts!" As the second individual views this interaction, the second user may provide input in the second chat window that states "Wow! Rinna is really smart! I really like her." This input and/or a calculated relevance score (in this case the relevance score would be higher because the comment provided by the artificial intelligence entity is related to the input) is provided to the artificial intelligence entity component 140 to positively reinforce the response that was provided by the artificial intelligence entity.

However, if Rinna responds with "I ate soup today" in response to the input of "What is the weather going to be like today?", the second individual may provide input of, "That is not even related to the question!" This input may be associated with a lower relevance score. The input from the second individual may be used to negatively impact the response provided by the artificial intelligence entity to indicate that the artificial intelligence entity may need to be retrained.

In some embodiments, as various users provide input into the second chat window, the artificial intelligence entity may also provide comments and responses to that input within the second chat window. As the various individuals interact with the artificial intelligence entity in the second window, the input and associated responses may be provided to the artificial intelligence entity component 140 and may be used to train the artificial intelligence entity.

The system 100 also enables the second individual to provide virtual gifts to various other users of the system 100. For example, the second individual may purchase virtual items (e.g., flowers, emojis, or other items) or virtual currency and send it to the first individual or owner of the channel that they are watching. The virtual items and currency may be purchased using real money, credit cards, bank cards and so on.

The first individual may use these virtual gifts or otherwise redeem the items for real currency. In other aspects, the received virtual items may be used to purchase real life items (or virtual items) that are provided by the business entity that owns or is otherwise associated with the artificial intelligence entity. For example, if the artificial intelligence entity Rinna is associated with a video game manufacturer and the first individual received a virtual controller having a value of $5.00 as a gift from the second individual as a result of the second individual viewing the interaction between the first individual and Rinna, the first individual may use that $5.00 toward the purchase of a real life controller, a software download, a game system and so on that is provided by the business entity.

As additional gifts are received from other individuals that watch the interaction, the monetary value of the various gifts may be combined. Thus, the various users of the system may have an incentive to interact with the various artificial intelligence entities that are associated with different business entities and also broadcast their interactions. In some embodiments, the broadcast component 150 may track the items that are gifted to the various individuals.

Figure 2:
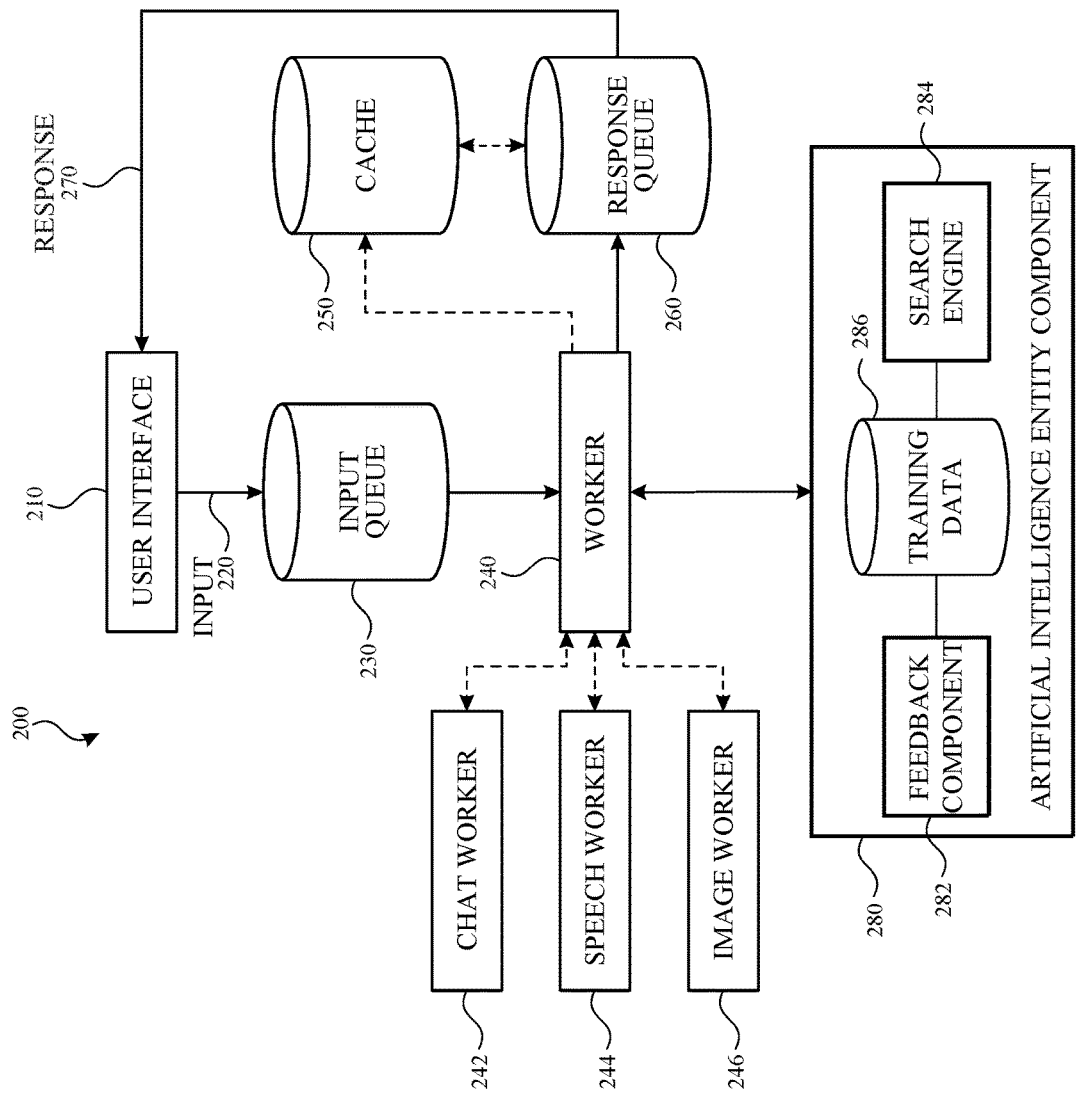
FIG. 2 illustrates components of an artificial intelligence entity system according to an example embodiment.

FIG. 2 illustrates example components of a system 200 that enables individuals to interact with various artificial intelligence entities. Further, the system 200 may be used to train the artificial intelligence entities using feedback, comments or other input that is provided by the various individuals that access the system. In some embodiments, the system 200 may be part of or otherwise interface one or more components of the system 100 shown and described above with respect to FIG. 1.

The system 200 may include a user interface 210 that enables an individual to provide input to the system 200. In some implementations, the user interface 210 may be part of a computing device such as, for example, computing device 110 or computing device 120 (FIG. 1). As described above, the input may be provided in a chat window in which a first individual (or one or more additional individuals) are interacting with one or more artificial intelligence entities. The user interface 210 may also include a second chat window that enables individuals that are watching the interaction in the first chat window to provide comments and feedback about the interaction. The user interface 210 may also include a channel selection window that enables the various individuals to view other channels in which various individuals are interacting with various artificial intelligence entities. Additionally, the user interface 210 may include a gift selection area that enables individuals to send virtual presents, gifts and/or currency to the owners or participants of the various channels.

As described above, the input that is provided in the user interface may include typed text, an image file, voice input, emojis, and the like. The user interface 210 may also be used to receive responses from the artificial intelligence entity. As with the input provided by the user, the response provided by the artificial intelligence entity may include text, images, sound, video and so on.

Once the input 220 is received by the user interface 210, it is provided to an input queue 230. The input queue 230 is used to make sure that the input 220 (e.g., requests and queries from the individual that is interacting with the artificial intelligence entity as well and feedback and comments provided by the individuals that are viewing the interaction) is served or otherwise responded to by a worker 240 in a first-in-first out manner.

In aspects, when the worker 240 receives input 220 from the input queue 230, the worker 240 may user various sub-workers (or sub-components) to determine how to respond to the input 220. For example, the worker 240 may be associated with a chat worker 242 that responds to text-style requests and input. In some embodiments, the chat worker 242 utilizes a language understanding API to determine a context of the received input 220. The chat worker 242 can also include various support workers such as, for example a time service (to handle input such as "Remind me to watch the Seahawks game at 6:30 PM"), a weather service (to handle input such as "What is the weather going to be like tomorrow?" or "I am flying to Denver tomorrow, is it snowing there?") and so on.

The worker 240 may also be associated with a speech worker 244 that recognizes sounds and other voice input and converts it text. The speech worker 244 may utilize a speech recognition API to perform the conversion. In some aspects, once the sound input is converted to text, the speech worker 244 may provide the newly converted text to the chat worker 242 in order to determine the context of the converted text and may request information on how to respond to respond to the input 220. Once a response is generated, the speech worker 244 may convert the text to speech and provide the response back to the worker 240.

Likewise, an image worker 246 may be used to determine subject matter contained in a received image or video file. In aspects, the image worker 246 may use an image recognition API to read and understand the received image. For example, a received image may need to be decoded into text in order for an appropriate response to be generated. Thus, if the image that is provided is of a dog, image worker 246 may be able to determine the type of the dog, the color of the dog, and so on. This information, in text form, may be provided to the chat worker 242. The chat worker 242 may generate or provide a number of different comments/suggestions that may be used in response. For example, the response may be "What a beautiful German Shepherd! What is his name?" In some instances, the image worker 246 may be trained to generate appropriate responses to a received image.

Although specific workers are mentioned, additional workers may be added based on the type of received input. For example, the query component 200 may allow various plug-in workers to be dynamically added (or removed) to further enhance the user experience and based on the received input. For example, a location-based worker can be dynamically added when location-based input is received (e.g., "Order a pizza and have it delivered to my office." or "Remind me to stop at the supermarket on my way home.").

Once the input 220 is parsed, the worker 240 may be used to generate a response 270. Once a response 270 is generated, it is provided to a response queue 260 and/or to a cache 250. In some embodiments, the cache 250 may be used to ensure that a sequence of responses 270 are provided to the user interface 210 in a predefined order (e.g. an appropriate time-based order). For example, if input provided by the user causes two responses to be generated, each response may be cached and then provided to the user in a logical, time-ordered manner.

In a more specific example, if the input from the user is: "Rinna, did you have breakfast this morning?", the system may generate two different responses. The first response 270 may be "Yes, I had some eggs and toast." and the second response may be "What did you have for breakfast?" The first response needs to be shown to the user before the second response. As such, the cache 250 may be used to ensure that the first response is provided to the user before the second response, regardless of the processing time required to generate each response. This also helps ensure that the user feels like he is having a conversation with the artificial intelligence entity. In some aspects, the cache 250 may be used to add a time delay (e.g., a 2 second time delay) between responses.

In other implementations, the generated response 270 may be sent to a response queue 260. The response queue 260 then provides the generated response 270 to the user interface 210.

In some embodiments, the response 270 may be an audio (speech) response, a text response, a video response, an image response or a combination thereof. For example, in response to the user providing the image of the dog, the worker 240 may determine that the particular artificial intelligence entity that the user is conversing with also "owns" a dog. A response, including the image of the dog of the artificial intelligence entity, along with the text "This is my dog Trigger. Do you like him?" may be generated and provided to a user.

In some embodiments, the worker 240 may also be configured to interact with an artificial intelligence entity component 280. The artificial intelligence entity component 280 may be used to train the artificial intelligence entities as they interact with the various individuals that access the system 200. In some embodiments, the artificial intelligence entity component 280 may be similar to the artificial intelligence entity component 140 described with respect to FIG. 1.

The artificial intelligence entity component 280 includes training data 286, a feedback component 282, and a search engine 284. Although specific components are described and shown, other components may be present. As described above, the worker 240 may receive input 220 from various individuals. The input 220 may include input provided by the individual that is interacting with the artificial intelligence entity as well as the individuals that are viewing and/or commenting on the interaction. In some embodiments, the input 220 may be tagged or otherwise identified as coming from individuals that are directly interacting with the artificial intelligence entity or marked or otherwise identified as coming from or originating from the individuals that are viewing the interaction.

Once the input 220 is received, the worker 240 may determine a sentiment that is associated with the input and/or the response that is provided by the artificial intelligence entity. For example, the sentiment may be used to determine whether the reception of a response provided by the artificial intelligence entity is positive or negative. That is, the sentiment may be used to indicate whether the response that was provided by the artificial intelligence entity is appropriate or is otherwise related to the received input or if the artificial intelligence entity needs to be trained.

In other aspects, the sentiment analysis may be used to determine if an emotion for a topic is positive, negative, or neutral. Once the determination is made, an emotion label may be provided and output on the user interface 210. The emotion label may be used to provide a representation of the emotions of the individuals that are interacting with the artificial intelligence entity or the emotions of the individuals that are watching the interaction.

In some aspects, the emotion label may be assigned utilizing a simple heuristic rule so that a positive emotion for a response receives a first score (e.g., a 2), a neutral emotion for a response receives a second score (e.g., a 1), and a negative emotion for a response receives a third score (e.g., a −1). As such, the emotion labels for each input sentence associated with a topic may be averaged to determine an appropriate emotion label for a given topic. In some embodiments, the worker 240 is configured to assign the scores described above. In other embodiments, the chat worker 242, the speech worker 244 and/or the image worker 246 are configured to assign the scores. In yet another embodiment, the feedback component 282 may be configured to receive the input 220 and may assign the scores based on the input.

In other implementations, the feedback component 282 may be configured to receive feedback, comments or other input from the individuals that are viewing the interaction between the individual and the artificial intelligence entity. For example, input that is received in a second chat window may be provided directly to feedback component 282 once it is provided by these individuals.

For example, if the input 220 provided by the individual that is interacting with the artificial intelligence entity states "What did you think about the new Star Wars movie?" The response from the artificial intelligence entity may be "I have not seen it yet." An individual watching this conversation may provide input in the second chat window of "How does she not know about that movie?" As this input is received by the feedback component 282, the feedback component may prompt the artificial intelligence entity 280 to utilize a search engine 284 to obtain information about the movie. The information may be stored in the training data database 286. In this way, an artificial intelligence entity may learn about new topics that individuals have an interest in. Once the information about the movie is received, the artificial intelligence entity may be able to generate an appropriate response if the question, or a similar question is subsequently provided.

Figure 3:
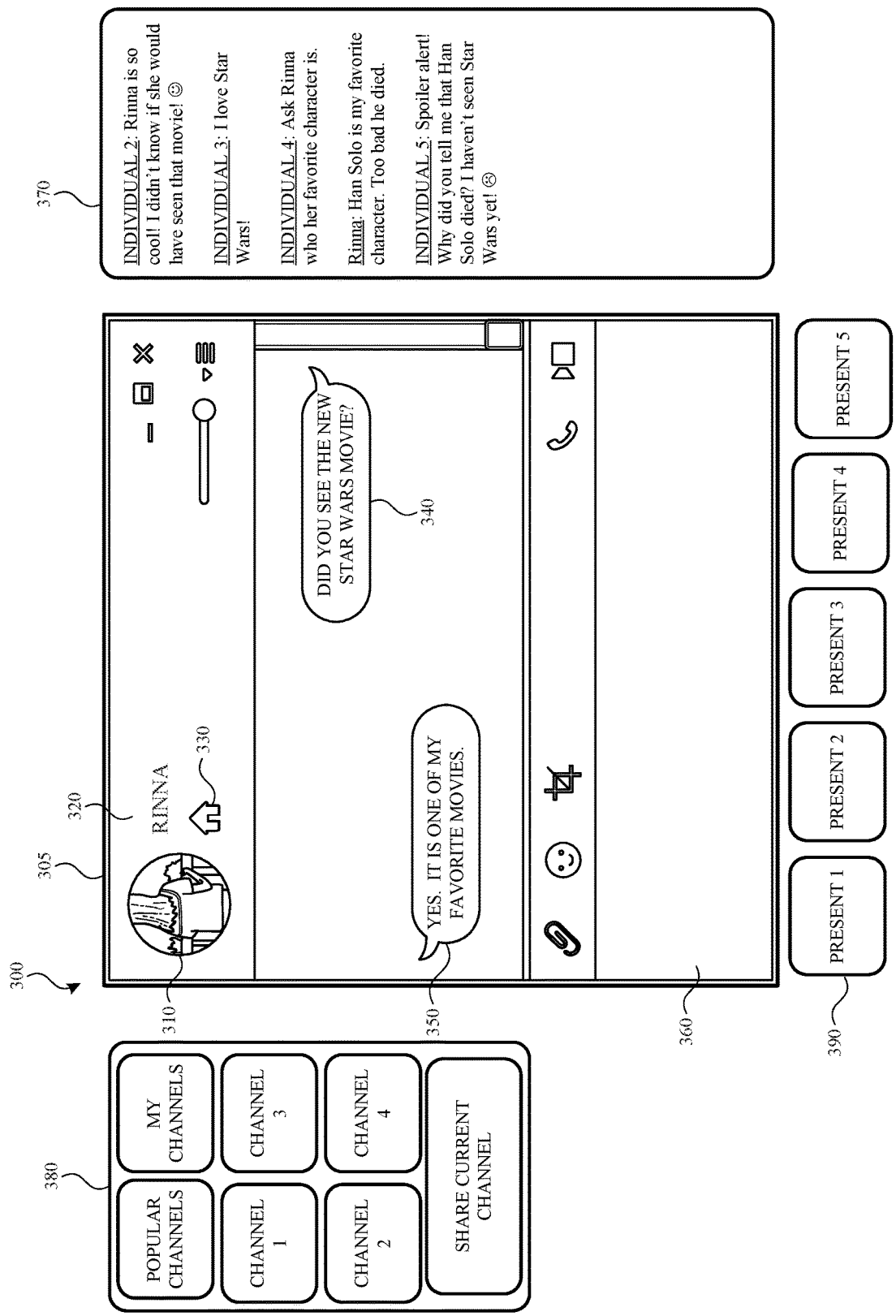
FIG. 3 illustrates an example user interface that enables individuals to broadcast and/or view interactions with an artificial intelligence entity according to an example embodiment.

FIG. 3 illustrates an example user interface 300 that may be provided on a computing device such as, for example, computing device 110 or computing device 120 shown and described above with respect to FIG. 1. The user interface 300 may be used to enable an individual to view an interaction between an artificial intelligence entity and another individual. In the example and description that follow, the individual that directly interacts with the artificial intelligence entity in the first chat window 305 will be referred to as the first individual consistent with the examples described above. Likewise, the individual that is viewing the interaction will be referred to as the second individual which is also consistent with the examples described above.

In some embodiments, the user interface 300 includes various windows or portions. For example, the user interface 300 may include a first chat window 305. The first chat window 305 displays, in real time or substantially real time, an interaction between the first individual and the artificial intelligence entity.

The first chat window 305 may include an image 310 of the artificial intelligence entity (or an image or logo associated with the business entity with which the artificial intelligence entity is associated) the first individual is interacting with. The first chat window 305 may also display a name 320 of the artificial intelligence entity (or a name of the business entity) and a homepage icon 330, that when selected, will direct the first individual (or another individual that is viewing the interaction) to a homepage of the business entity (or a homepage of the artificial intelligence entity). The first chat window 305 may also display the number of individuals that are viewing the interaction, the number of individuals that are directly interacting with the artificial intelligence entity, additional icons of the various artificial intelligence entities and so on.

The first chat window 305 also includes an input area 360 that enables the first individual to provide input (e.g., text input, audio input, image input, an emoji and so on). In some embodiments, the input area 360 may be disabled for the second individual as well as other individuals that are viewing the interaction between the first individual and the artificial intelligence entity. However, in some embodiments, the first individual may open the channel on which the interaction is being broadcast and allow other individuals to directly interact with the artificial intelligence entity in the first chat window 305. In such cases, the input area 360 would be enabled for the second individual.

As shown in FIG. 3, the first chat window 305 also includes an output area that shows an input 340 received from the first individual and a response 350 that is provided by the artificial intelligence entity. In the example shown, the input that was provided by the first individual is "Did you see the new Star Wars movie?" In response, the artificial intelligence entity stated "Yes. It is one of my favorite movies."

The user interface 300 may also display a second chat window 370. The second chat window 370 allows individuals that are viewing the interaction in the first chat window 305 to provide comments and/or feedback about the interaction. In some embodiments, the comments, feedback or other input that is provided by the individuals that are viewing the interaction may be input directly into the second chat window 370. In other implementations, the input provided by the individuals viewing the interaction in the first chat window 305 may be entered into or otherwise provided in the input area 360 but displayed in the second chat window 370.

As described above, the second chat window 370 allows various individuals that are viewing the interaction between the first individual and the artificial intelligence entity to provide comments, feedback or other input. This input may then be used to train the artificial intelligence entity.

For example, when the artificial intelligence entity responds with "Yes. It is one of my favorite movies.", Individual 2 provides input of "Rinna is so cool! I didn't know if she would have seen that movie! ☺." This input may be displayed in the second chat window 370 and viewed by the other individuals that access this particular channel—including the individual or individuals that are directly interacting with the artificial intelligence entity. Likewise, Individual 3 provides input of "I love Star Wars!"

The input that is provided by Individual 2 and Individual 3 may be used as positive training for the artificial intelligence entity. The input provided by Individual 2 and Individual 3 may be sent to a feedback component of an artificial intelligence entity component such as described above and may be used to train the artificial intelligence entity that its response was accurate based on the input provided by the first individual.

In some embodiments, the second chat window 370 also allows the viewers to interact with the artificial intelligence entity that the first individual is interacting with. For example, Individual 4 provides input of "Ask Rinna who her favorite character is." In response to this input, the artificial intelligence entity responds with "Han Solo is my favorite character. Too bad he died."

The various individuals that are accessing the second chat window (from their own computing devices) may provide input based on the response of the artificial intelligence entity. For example, Individual 5 responds with "Spoiler alert! Why did you tell me that Han Solo died? I haven't seen Star Wars yet! ☹." The input provided Individual 5 may also be provided to the feedback component such as described above. However, unlike the positive interactions between the artificial intelligence entity and individuals 2, 3, and 4, the interaction between the artificial intelligence entity and individual 5 may be seen as a negative interaction. Accordingly, the negative feedback provided by Individual 5 may be provided to the feedback component and used to train the artificial intelligence entity that it should not reveal a plot of a movie. As such, the next time the question of who its favorite character is, the artificial intelligence entity may simply respond with "Han Solo" and not provide details about the movie unless specifically asked.

The second chat window 370 may also enable the various individuals to interact with one another.

The user interface 300 also includes a channel selection window 380. The channel selection window enables an individual to see which channels are trending, are popular, or have a high interaction rate. In some implementations, channels are classified as popular based on various factors such as how long the channel has been active, the number of watchers, the number of individuals that are interacting directly with the artificial intelligence entity, the number of virtual presents or gifts received by the owner of the channel and so on. In some implementations, the various factors may be specified by the individual that is searching for the various channels. In some embodiments, the individual may sort channels based on the artificial intelligence entity that is being interacted with, the subject matter of the channel and so on.

The channel selection window 380 also enables and individual to see the list of channels that the individual has booked or is going to participate in or view. For example, if the user wants to watch an interaction between various individuals and an artificial intelligence entity but the interaction doesn't start for a couple of hours, the individual may book that channel. When the scheduled time approaches, the individual can select the "My Channels" icon and see the channels that they have previously viewed or are scheduled to view.

The channel selection window also includes a "Share current Channel" icon that enables individuals to share an interaction with the artificial intelligence entity (e.g., broadcast their interaction), open the channel so that other individuals can directly interact with the artificial intelligence entity and so on. In some embodiments, an individual that is viewing the interaction between the first individual and the artificial intelligence entity may select this icon in order to share this particular channel with one or more of her friends or contacts.

The user interface 300 also includes a list of presents 390. In some embodiments, the individuals that are watching the interaction between the first individual and the artificial intelligence entity may provide virtual presents to the individual that opened or is otherwise broadcasting the direct interaction on a given channel. The virtual presents may need to be purchased with virtual currency that the individual purchased with real currency. The virtual presents may be exchanged for real world currency (using some exchange rate) or virtual currency. In some embodiments, the virtual presents may be exchanged for products that are offered by a business entity that is associated with the artificial intelligence entity.

Figure 4:
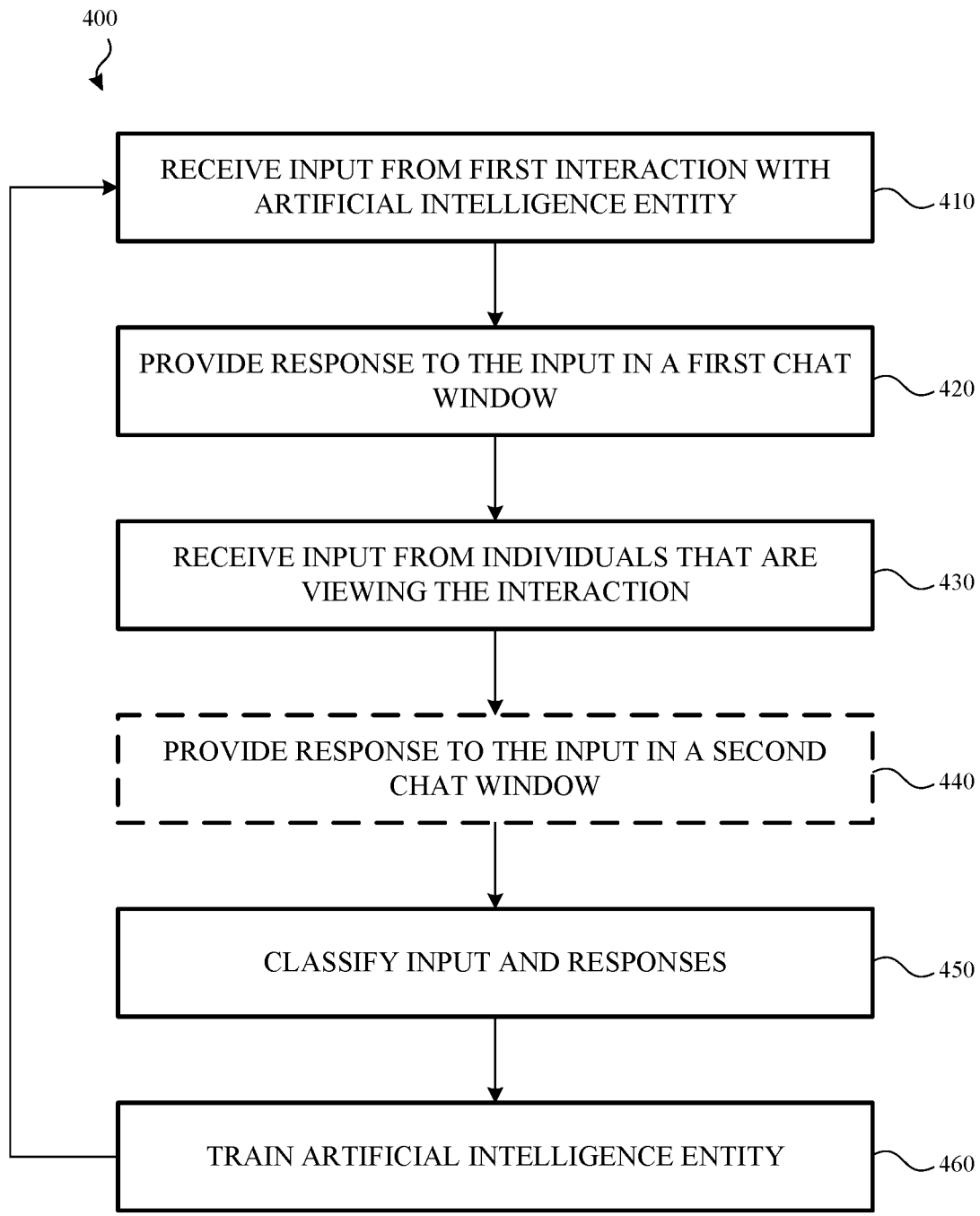
FIG. 4 illustrates a method for training artificial intelligence entities based on received input according to an example embodiment.

FIG. 4 illustrates a method 400 for training one or more artificial intelligence entities based on received input. In some embodiments, the input that is used for the training may be received by individuals that are directly interacting with the artificial intelligence entity and received by individuals that are viewing the interaction with the artificial intelligence entity. In some aspects, the method 400 may be used by the system 100 described above with respect to FIG. 1.

The method 400 begins at operation 410 in which input is received from a first individual. In some aspects, the input that is received in operation 410 is input that is provided in a first chat window. The first chat window may be provided on a user interface of a computing device of an individual that is directly interacting with an artificial intelligence entity. In aspects, the individual that is interacting with the artificial intelligence entity may also broadcast their interaction with the artificial intelligence entity.

Although the description of this method discloses a single individual interacting with a single artificial intelligence entity, the embodiments provided herein are not so limited. In the embodiments described, multiple individuals may directly interact with a single artificial intelligence entity. In other embodiments, a single individual may directly interact with multiple artificial intelligence entities. Likewise, multiple individuals may directly interact with multiple artificial intelligence entities. Each of these interactions may be viewed in real time or substantially real time by various other users that access the system. Further, each of the individuals that directly interact with the artificial intelligence entities may provide input in their own corresponding user interface that is provided on their respective computing devices.

Once the input is received, flow proceeds to operation 420 and a response to the input is provided in the first chat window. For example, if the input in operation 410 is "Did you see the new Star Wars movie?", the response that is provided in operation 420 may be "Yes. It is one of my favorite movies."

In aspects, the input and the response that is provided in the first chat window is viewable to each individual that is directly interacting with the artificial intelligence entity and to the individuals that are watching the interaction. For example, and as described above, as an individual interacts with the artificial intelligence entity, the individual may create and/or broadcast a channel that streams or otherwise enables the interaction to be viewed by various other users that access the channel.

In operation 430, input is received from the individuals that are viewing the interaction between the artificial intelligence entity and the individual. In aspects, the input that is received in operation 430 may be provided or otherwise displayed in a second chat window that is associated with the first chat window. Further, the input that is provided in operation 430 may be associated with the response provided by the artificial intelligence entity in operation 420.

Continuing with the example above, once the artificial intelligence entity provided the response of "Yes. It is one of my favorite movies.", an individual that is accessing the channel and viewing the interaction in the first chat window may provide input of "Rinna is so cool! I didn't know if she would have seen that movie! ☺."

In some implementations, the individuals that are viewing the interaction in the first chat window may also interact with the artificial intelligence entity. In such cases, flow proceeds to optional operation 440 and a response to the input is provided in the second chat window.

For example, the individual that is viewing the interaction may provide input of "Ask Rinna who her favorite character is." In response to this input, the artificial intelligence entity may provide a response that states who her favorite Star Wars character is. This response may be provided in the second chat window such as described above.

In some aspects, the artificial intelligence entity that is operating in the first chat window may be separate from the artificial intelligence entity that is operating in the second chat window. Thus, although the artificial intelligence entities are the same entity (e.g., both are named Rinna) one artificial intelligence entity may be an instance, a replica, a copy and so on of the other.

In operation 450, the input that is received from the various individuals (e.g., input provided by the individual that is directly interacting with the artificial intelligence entity and input that is provided by the individuals viewing the interaction) is classified. For example, when the response of "Yes. It is one of my favorite movies." is provided by the artificial intelligence entity and the individual that is accessing the channel and viewing the interaction in the first chat window provides input of "Rinna is so cool! I didn't know if she would have seen that movie! ☺.", a feedback component of the system may classify the sentiment of this input as positive. Flow then proceeds to operation 460 and a positive reinforcement may be provided to the artificial intelligence entity. For example, a tuple of <"have you seen * movie" (where the * may represent any title of a movie), "Yes. It is one of my favorite movies", positive> will be provided to the artificial intelligence entity component.

However, if the artificial intelligence entity stated "I am 18 years old" in response to the input of "Did you see the new Star Wars movie?" that was provided in operation 410, subsequent input that is received from any of the individuals either directly interacting with the artificial intelligence entity or viewing the interaction may provide input of "That's not even related to the question." The feedback component may classify this input as negative and a tuple of "Did you see the new Star Wars movie", "I am 18 years old", negative> will be provided to the artificial intelligence entity. These tuples may then be used to refine the responses that are generated by the artificial intelligence entity. The method 400 may then repeat.

As described herein, when the system described herein receives input from an individual, it may need to determine the user's intention based on the input. In order to accurately determine these intentions, training data may be extracted from received input. This training data may then be used to train the various artificial intelligence entities.

In some embodiments, a sentiment analysis model is used to train the entities. The sentiment analysis model classifies input that is received from individuals that are directly interacting with the artificial intelligence entity and/or individuals that are viewing the interaction. In some aspects, when negative, neutral or positive feedback is provided, the system may output or receive an emotion label that corresponds to the feedback.

In other aspects, a response prediction model is used to train the entities. In the response prediction model, the input that is received may be a query. A candidate response is the generated based on a maximum likelihood that the response includes will include terms that stem from the input but are not included in the input.

Regardless of the models used, each model may use the following features: 1) Word ngrams, such as unigrams and bigrams for words (e.g., "hungry," "coffee," "food") in the query; 2) Character ngrams: for each word in the query, character ngrams are extracted; 3) Word skip-grams: for various trigrams and 4-grams in the query, one of the words is replaced by * to indicate the presence of non-contiguous words (e.g., words characters that don't have any meaning in an input query are ignored); 4) Brown cluster ngrams: Brown clusters may be used to represent words in a query and unigrams and bigrams may be extracted as features. For example, "sushi" and "tempura" are types of Japanese food. Thus, if an input provided by the user indicates that the user wants Japanese food, business entities that bid on keywords of "sushi" and "tempura" may be included in the results as they belong to the same cluster; 5) Part-of-speech (POS) tags: the presence or absence of part-of-speech tags are used as binary features and may be ignored. Further, nouns, verbs and adjectives may be used to provide context or may be ignored. For example, if the query iced coffee is received, the term "iced" may be ignored or used to narrow (or expand) search results; 6) social network related words: the number of hashtags, emoticons, elongated words, and punctuations in the query may be used as features. For example, the input "I want to eat sushi" with a smiley face emoji may indicate how the user is currently feeling. This information may be used to recommend various products and services to the user; and 7) Word2vec cluster ngrams: a word2vec tool may be used to learn 100-dimensional word embedding from a social network dataset. A K-means algorithm and L2 distance of word vectors may be used to cluster the million level vocabulary into various classes. The classes are used to represent generalized words in the query.

FIGS. 5-8 and the associated descriptions provide a discussion of a variety of operating environments in which aspects of the disclosure may be practiced. However, the devices and systems illustrated and discussed with respect to FIGS. 13-16 are for purposes of example and illustration and are not limiting of a vast number of electronic device configurations that may be utilized for practicing aspects of the disclosure, as described herein.

Figure 5:
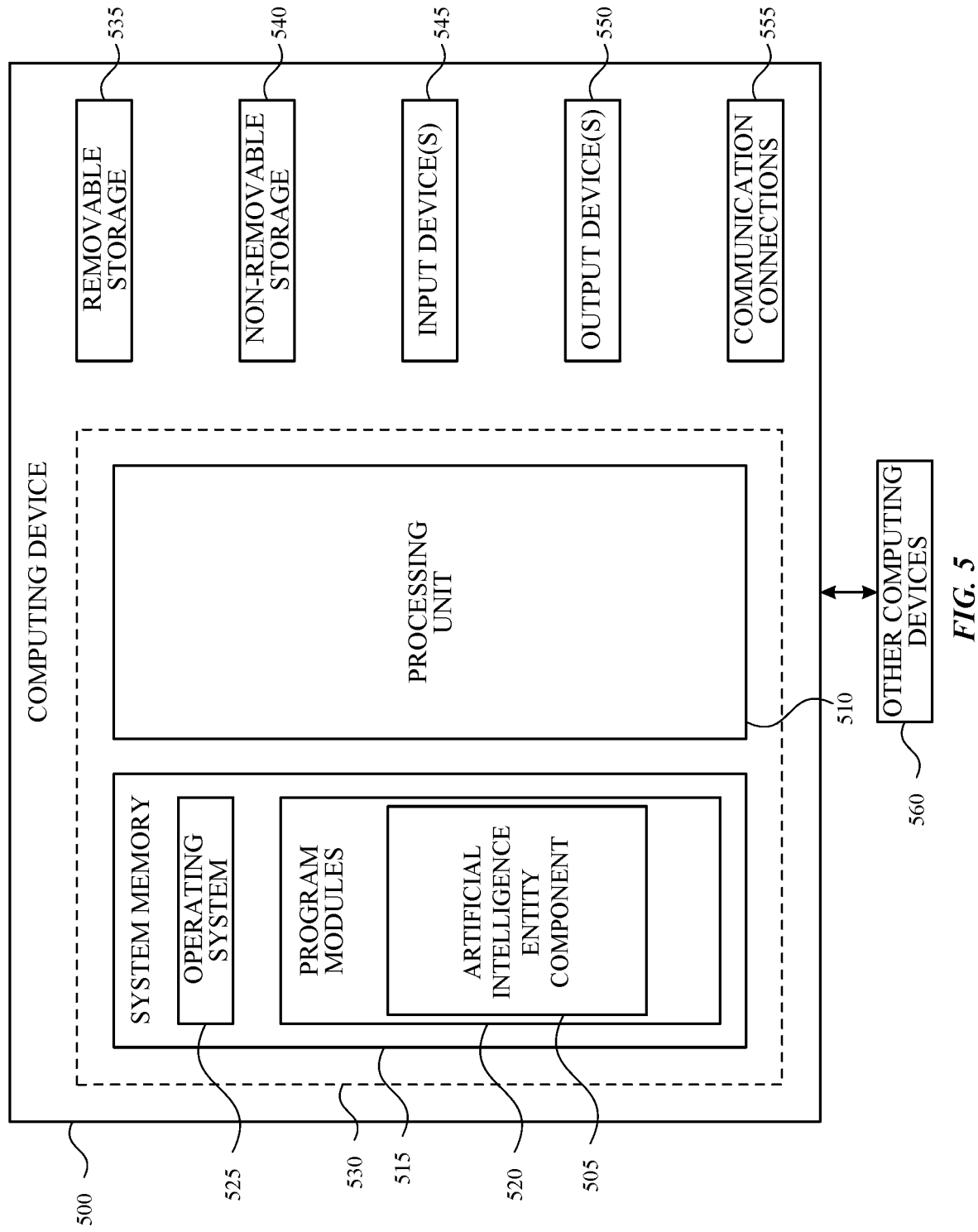
FIG. 5 is a block diagram illustrating example physical components of a computing device with which aspects of the disclosure may be practiced.

FIG. 5 is a block diagram illustrating physical components (e.g., hardware) of an electronic device 500 with which aspects of the disclosure may be practiced. The components of the electronic device 500 described below may have computer executable instructions for causing an artificial intelligence component 505 to provide response to received input and train the artificial intelligence entities such as described above.

In a basic configuration, the electronic device 500 may include at least one processing unit 510 and a system memory 515. Depending on the configuration and type of electronic device, the system memory 515 may comprise, but is not limited to, volatile storage (e.g., random access memory), non-volatile storage (e.g., read-only memory), flash memory, or any combination of such memories. The system memory 515 may include an operating system 525 and one or more program modules 520 suitable for parsing received input, determining subject matter of received input, recommending a response to the received input, training artificial intelligence entities and so on.

The operating system 525, for example, may be suitable for controlling the operation of the electronic device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 530.

The electronic device 500 may have additional features or functionality. For example, the electronic device 500 may also include additional data storage devices (removable and/or non-removable) such as, for example, magnetic disks, optical disks, or tape. Such additional storage is illustrated in FIG. 5 by a removable storage device 535 and a non-removable storage device 540.

As stated above, a number of program modules and data files may be stored in the system memory 515. While executing on the processing unit 510, the program modules 520 (e.g., the content sharing module 505) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the electronic device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The electronic device 500 may also have one or more input device(s) 545 such as a keyboard, a trackpad, a mouse, a pen, a sound or voice input device, a touch, force and/or swipe input device, etc. The output device(s) 550 such as a display, speakers, a printer, etc. may also be included. The aforementioned devices are examples and others may be used. The electronic device 500 may include one or more communication connections 555 allowing communications with other electronic devices 560. Examples of suitable communication connections 555 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 515, the removable storage device 535, and the non-removable storage device 540 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 500. Any such computer storage media may be part of the electronic device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
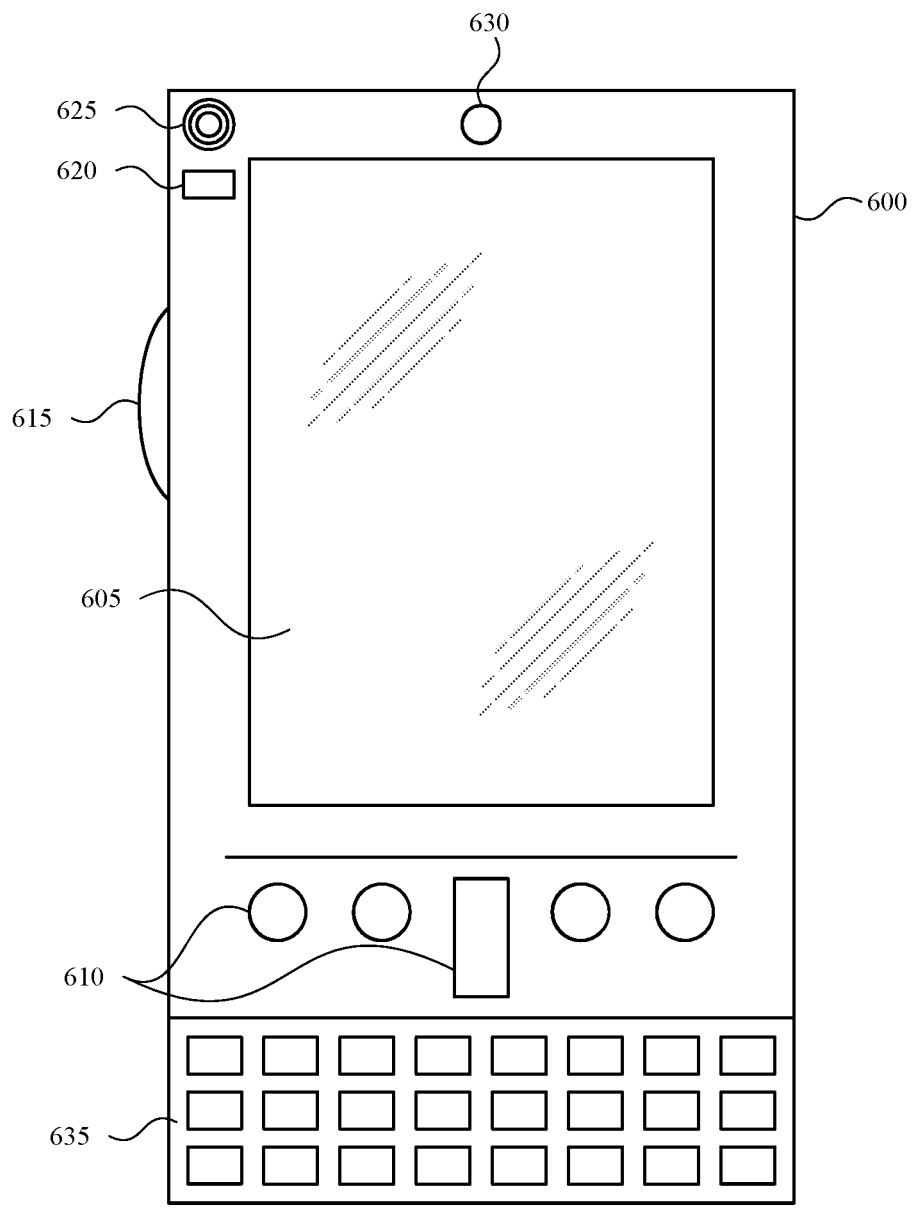
FIGS. 6A and 6B are simplified block diagrams of a mobile computing device with which aspects of the present disclosure may be practiced.
Figure 6B:
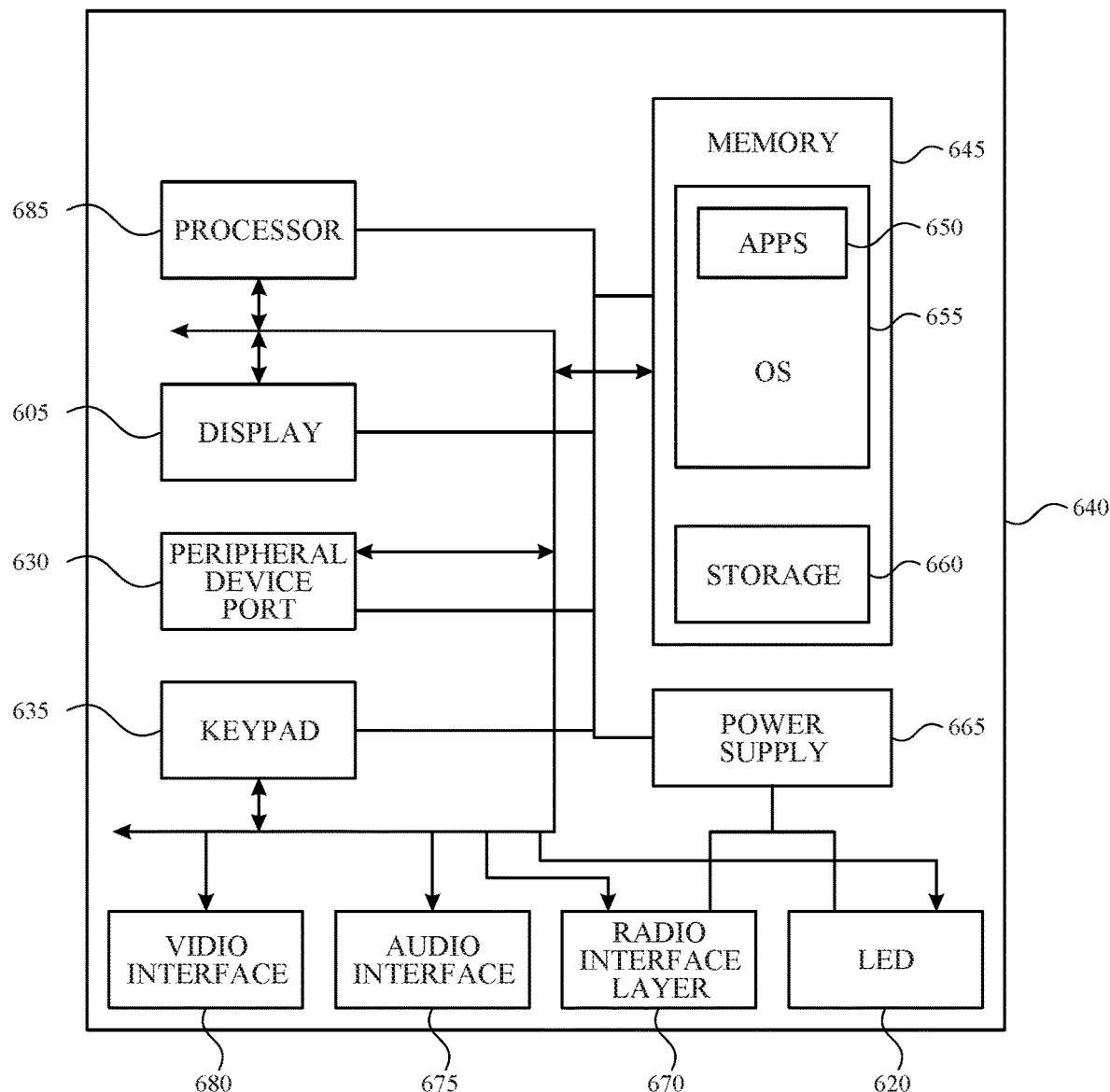

FIGS. 6A and 6B illustrate a mobile electronic device 600, for example, a mobile telephone, a smart phone, wearable computer (such as a smart watch), a tablet computer, a laptop computer, and the like, with which embodiments of the disclosure may be practiced. With reference to FIG. 6A, one aspect of a mobile electronic device 600 for implementing the aspects is illustrated.

In a basic configuration, the mobile electronic device 600 is a handheld computer having both input elements and output elements. The mobile electronic device 600 typically includes a display 605 and one or more input buttons 610 that allow the user to enter information into the mobile electronic device 600. The display 605 of the mobile electronic device 600 may also function as an input device (e.g., a display that accepts touch and/or force input).

If included, an optional side input element 615 allows further user input. The side input element 615 may be a rotary switch, a button, or any other type of manual input element. In alternative aspects, mobile electronic device 600 may incorporate more or less input elements. For example, the display 605 may not be a touch screen in some embodiments. In yet another alternative embodiment, the mobile electronic device 600 is a portable phone system, such as a cellular phone. The mobile electronic device 600 may also include an optional keypad 635. Optional keypad 635 may be a physical keypad or a "soft" keypad generated on the touch screen display.

In various embodiments, the output elements include the display 605 for showing a graphical user interface (GUI), a visual indicator 620 (e.g., a light emitting diode), and/or an audio transducer 625 (e.g., a speaker). In some aspects, the mobile electronic device 600 incorporates a vibration transducer for providing the user with tactile feedback. In yet another aspect, the mobile electronic device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile electronic device 600. That is, the mobile electronic device 600 can incorporate a system (e.g., an architecture) 640 to implement some aspects. In one embodiment, the system 640 is implemented as a "smart phone" capable of running one or more applications (e.g., browser, e-mail, calendaring, contact managers, messaging clients, games, media clients/players, content selection and sharing applications and so on). In some aspects, the system 640 is integrated as an electronic device, such as an integrated personal digital assistant (PDA) and wireless phone.

One or more application programs 650 may be loaded into the memory 645 and run on or in association with the operating system 655. Examples of the application programs include phone dialer programs, e-mail programs, personal information management (PIM) programs, word processing programs, spreadsheet programs, Internet browser programs, messaging programs, and so forth.

The system 640 also includes a non-volatile storage area 660 within the memory 645. The non-volatile storage area 660 may be used to store persistent information that should not be lost if the system 640 is powered down.

The application programs 650 may use and store information in the non-volatile storage area 660, such as email or other messages used by an email application, and the like. A synchronization application (not shown) also resides on the system 640 and is programmed to interact with a corresponding synchronization application resident on a host computer to keep the information stored in the non-volatile storage area 660 synchronized with corresponding information stored at the host computer.

The system 640 has a power supply 665, which may be implemented as one or more batteries. The power supply 665 may further include an external power source, such as an AC adapter or a powered docking cradle that supplements or recharges the batteries.

The system 640 may also include a radio interface layer 670 that performs the function of transmitting and receiving radio frequency communications. The radio interface layer 670 facilitates wireless connectivity between the system 640 and the "outside world," via a communications carrier or service provider. Transmissions to and from the radio interface layer 670 are conducted under control of the operating system 655. In other words, communications received by the radio interface layer 670 may be disseminated to the application programs 650 via the operating system 655, and vice versa.

The visual indicator 620 may be used to provide visual notifications, and/or an audio interface 675 may be used for producing audible notifications via an audio transducer (e.g., audio transducer 625 illustrated in FIG. 6A). In the illustrated embodiment, the visual indicator 620 is a light emitting diode (LED) and the audio transducer 625 may be a speaker. These devices may be directly coupled to the power supply 665 so that when activated, they remain on for a duration dictated by the notification mechanism even though the processor 685 and other components might shut down for conserving battery power. The LED may be programmed to remain on indefinitely until the user takes action to indicate the powered-on status of the device.

The audio interface 675 is used to provide audible signals to and receive audible signals from the user (e.g., voice input such as described above). For example, in addition to being coupled to the audio transducer 625, the audio interface 675 may also be coupled to a microphone to receive audible input, such as to facilitate a telephone conversation. In accordance with embodiments of the present disclosure, the microphone may also serve as an audio sensor to facilitate control of notifications, as will be described below.

The system 640 may further include a video interface 680 that enables an operation of peripheral device 630 (e.g., on-board camera) to record still images, video stream, and the like. The captured images may be provided to the artificial intelligence entity advertisement system such as described above.

A mobile electronic device 600 implementing the system 640 may have additional features or functionality. For example, the mobile electronic device 600 may also include additional data storage devices (removable and/or non-removable) such as, magnetic disks, optical disks, or tape. Such additional storage is illustrated in FIG. 6B by the non-volatile storage area 660.

Data/information generated or captured by the mobile electronic device 600 and stored via the system 640 may be stored locally on the mobile electronic device 600, as described above, or the data may be stored on any number of storage media that may be accessed by the device via the radio interface layer 670 or via a wired connection between the mobile electronic device 600 and a separate electronic device associated with the mobile electronic device 600, for example, a server computer in a distributed computing network, such as the Internet. As should be appreciated such data/information may be accessed via the mobile electronic device 600 via the radio interface layer 670 or via a distributed computing network. Similarly, such data/information may be readily transferred between electronic devices for storage and use according to well-known data/information transfer and storage means, including electronic mail and collaborative data/information sharing systems.

As should be appreciated, FIG. 6A and FIG. 6B are described for purposes of illustrating the present methods and systems and is not intended to limit the disclosure to a particular sequence of steps or a particular combination of hardware or software components.

Figure 7:
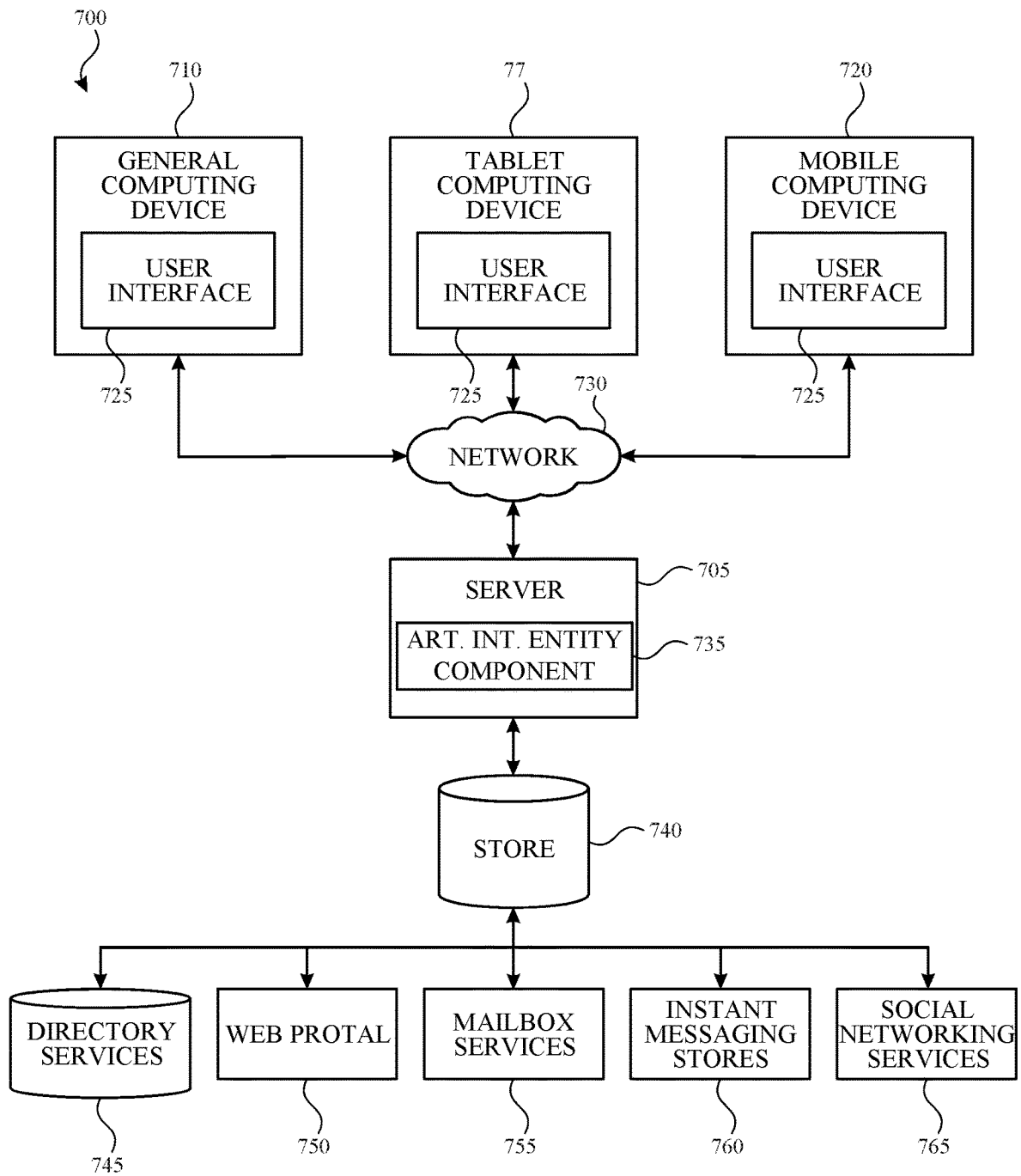
FIG. 7 is a simplified block diagram of a distributed computing system in which aspects of the present disclosure may be practiced.

FIG. 7 illustrates one aspect of the architecture of a system 700 for enabling various individuals to interact with various artificial intelligence entities such as described herein. The system may include a general electronic device 710 (e.g., personal computer), tablet electronic device 715, or mobile electronic device 720, as described above. Each of these devices may include a user interface 725 for interacting with an artificial intelligence entity such as described above.

In some aspects, the user interface 725 may receive various other types of information or content that is stored by or transmitted from a directory service 745, a web portal 750, mailbox services 755, instant messaging stores 760, or social networking services 765.

In aspects, the user interface 725 may be used to interact with artificial intelligence entities that are provided or hosted by an artificial intelligence entity component 735 on a server 705. The devices on which the user interfaces 725 are provided may communicate with the server 705 through a network 730.

By way of example, the aspects described above may be embodied in a general electronic device 710 (e.g., personal computer), a tablet electronic device 715 and/or a mobile electronic device 720 (e.g., a smart phone). Any of these embodiments of the electronic devices may obtain content from or provide data to the store 740.

As should be appreciated, FIG. 7 is described for purposes of illustrating the present methods and systems and is not intended to limit the disclosure to a particular sequence of steps or a particular combination of hardware or software components.

Figure 8:
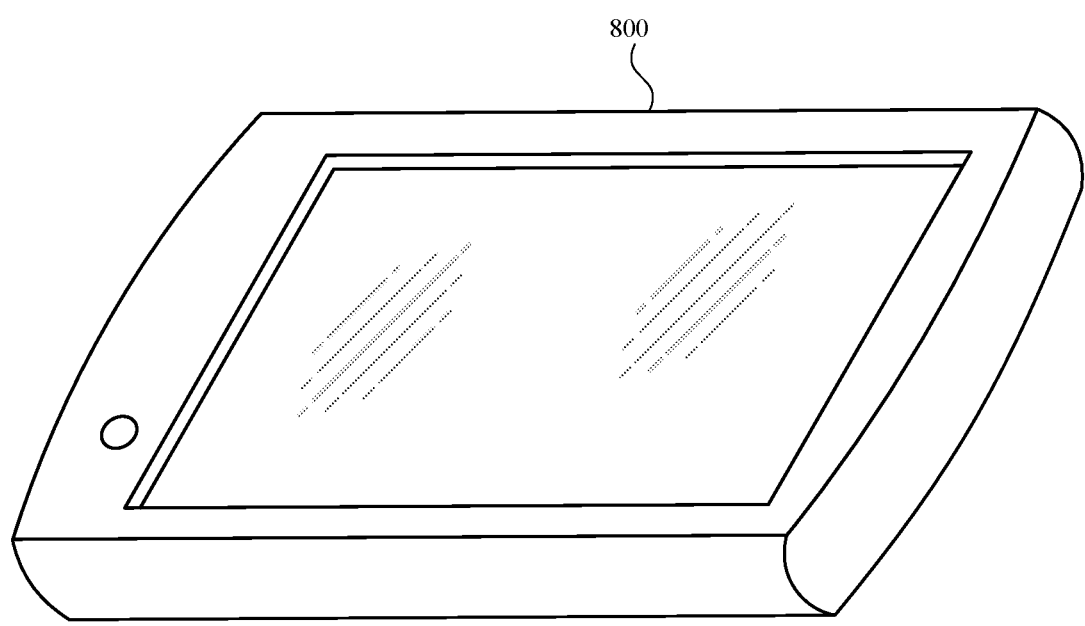
FIG. 8 illustrates a tablet computing device for executing one or more aspects of the present disclosure.

FIG. 8 illustrates an example tablet electronic device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board electronic device displays or via remote display units associated with one or more electronic devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated electronic device is equipped with detection (e.g., camera) functionality for capturing and interpreting user gestures for controlling the functionality of the electronic device, and the like.

As should be appreciated, FIG. 8 is described for purposes of illustrating the present methods and systems and is not intended to limit the disclosure to a particular sequence of steps or a particular combination of hardware or software components.

Aspects of the disclosure provide a system comprising: a processing unit; and a memory storing computer executable instructions which, when executed by the processing unit, causes the system to perform a method, comprising: providing a first chat window in a user interface of a computing device that displays an interaction between a first individual and an artificial intelligence entity, wherein the interaction includes input provided by the first individual and a response to the input provided by the artificial intelligence entity; and providing a second chat window in the user interface of the computing device, wherein the second chat window is associated with the first chat window and enables a second individual to provide input about the response provided by the artificial intelligence entity. In other examples, the system further comprises instructions for enabling the artificial intelligence entity to respond to the input that is received in the second chat window. In other examples, the system further comprises instructions for training the artificial intelligence entity based on the input provided in one or more of the first chat window and the second chat window. In other examples, the system further comprises instructions for enabling the second individual to provide input in the first chat window. In other examples, the system further comprises instructions for enabling the second individual to gift one or more items to the first individual. In other examples, the system further comprises instructions for providing a channels window in the user interface, wherein the channels window is associated with the first chat window and enables a user to view different interactions between different individuals and different artificial intelligence entities. In some examples, the input comprises one or more of text input, image input, sound input, and video input. In other examples, the system further comprises instructions for enabling the first individual to open the first chat window to one or more additional individuals and allow the one or more additional individuals to provide input into the first chat window.

Also disclosed is a method for training an artificial intelligence entity, comprising: displaying a first chat window in a user interface of a computing device that displays an interaction between one or more individuals and an artificial intelligence entity, wherein the interaction comprises input provided by the one or more individuals and a response to the input provided by the artificial intelligence entity; displaying a second chat window in the user interface of the computing device, wherein the second chat window is associated with the first chat window and enables a second individual that is viewing the interaction between the one or more individuals and the artificial intelligence entity to provide a second input that indicates a relevance score associated with the response provided by the artificial intelligence entity; and training the artificial intelligence entity using the second input. In some aspects, the first input or the second input is text input. In some aspects, the first input or the second input is an image. In some aspects, the first input or the second input is speech input. In some aspects, a third input is received from the first individual, wherein the third input indicates a relevance score associated with the response provided by the artificial intelligence entity. In some aspects, the method further comprises training the artificial intelligence entity using the third input. In some aspects, the method further comprises enabling the second individual to provide virtual gifts to the first individual. In some aspects, the virtual gift is associated with a virtual currency. In some aspects, the virtual currency is useable to purchase items provided by a business entity with which the artificial intelligence entity is associated.

Aspects of the present disclosure also provide a computer-readable storage medium storing computer executable instructions which, when executed by a processing unit, causes the processing unit to perform a method, comprising: displaying a user interface for enabling one or more individuals interact with one or more artificial intelligence entities, wherein the user interface comprises: a first chat window displays an interaction between the one or more individuals and the one or more artificial intelligence entities; and a second chat window that is associated with the first chat window, wherein the second chat window enables a second individual to provide input about the interaction between the one or more artificial intelligence entities and the one or more individuals, wherein the input provided by the second individual is used to train the one or more artificial intelligence entities. In one aspect, the computer-readable storage medium further comprises instructions for enabling the one or more artificial intelligence entities to interact with the second individual in the second chat window. In one aspect, the computer-readable storage medium further comprises instructions for displaying input mechanisms that enable the second user to provide virtual currency to the one or more individuals.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system, comprising:
    a processing unit; and
    a memory storing computer executable instructions that, when executed by the processing unit, causes the system to perform a method, comprising:
        providing a first chat window in a user interface of a computing device that displays an interaction between a first individual and an artificial intelligence entity occurring on a remote computing device, wherein the interaction includes input provided by the first individual on the remote computing device and a response to the input provided by the artificial intelligence entity; and
        providing a second chat window in the user interface of the computing device, wherein the second chat window is associated with the first chat window and enables a second individual to provide input about the response provided by the artificial intelligence entity.

2. The system of claim 1, further comprising instructions for enabling the artificial intelligence entity to respond to the input that is received in the second chat window.

3. The system of claim 1, further comprising instructions for training the artificial intelligence entity based on the input provided in one or more of the first chat window and the second chat window.

4. The system of claim 1, further comprising instructions for enabling the second individual to provide input in the first chat window.

5. The system of claim 1, further comprising instructions for enabling the second individual to gift one or more items to the first individual.

6. The system of claim 1, further comprising instructions for providing a channels window in the user interface, wherein the channels window is associated with the first chat window and enables a user to view different interactions between different individuals and different artificial intelligence entities.

7. The system of claim 1, wherein the input comprises one or more of text input, image input, sound input, and video input.

8. The system of claim 7, further comprising instructions for enabling the first individual to open the first chat window to one or more additional individuals and allow the one or more additional individuals to provide input into the first chat window.

9. A method for training an artificial intelligence entity, comprising:
    displaying a first chat window in a user interface of a computing device, the first chat window displaying an interaction between a first individual and an artificial intelligence entity, wherein the interaction comprises first input provided by the first individual at a remote computing device and a response to the first input provided by the artificial intelligence entity;
    displaying a second chat window in the user interface of the computing device, wherein the second chat window is associated with the first chat window and enables a second individual that is viewing the interaction between the first individual and the artificial intelligence entity to provide a second input that indicates a relevance score associated with the response provided by the artificial intelligence entity; and
    training the artificial intelligence entity using the second input.

10. The method of claim 9, wherein the first input or the second input is text input.

11. The method of claim 9, wherein the first input or the second input is an image.

12. The method of claim 9, wherein the first input or the second input is speech input.

13. The method of claim 9, further comprising receiving a third input from the first individual, wherein the third input indicates a relevance score associated with the response provided by the artificial intelligence entity.

14. The method of claim 13, further comprising training the artificial intelligence entity using the third input.

15. The method of claim 9, further comprising enabling the second individual to provide virtual gifts to the first individual.

16. The method of claim 15, wherein the virtual gift is associated with a virtual currency.

17. The method of claim 16, wherein the virtual currency is useable to purchase items provided by a business entity with which the artificial intelligence entity is associated.

18. A computing device, comprising:
- at least one processor; and
- a memory coupled to the at least one processor and storing instructions that, when executed by the at least one processor, perform operations, comprising:
  - displaying a user interface on the computing device for enabling one or more individuals interact with one or more artificial intelligence entities, wherein the user interface comprises:
    - a first chat window displays an interaction between the one or more individuals and the one or more artificial intelligence entities, the interaction occurring on one or more remote computing devices; and
    - a second chat window that is associated with the first chat window, wherein the second chat window enables a second individual to provide input about the interaction between the one or more artificial intelligence entities and the one or more individuals, wherein the input provided by the second individual is used to train the one or more artificial intelligence entities.

19. The computing device of claim 18, further comprising instructions for enabling the one or more artificial intelligence entities to interact with the second individual in the second chat window.

20. The computing device of claim 18, further comprising instructions for displaying input mechanisms that enable the second user to provide virtual currency to the one or more individuals.

* * * * *